US009379627B2

(12) United States Patent
Fornage et al.

(10) Patent No.: US 9,379,627 B2
(45) Date of Patent: Jun. 28, 2016

(54) POWER CONVERSION CIRCUIT ARRANGEMENTS UTILIZING RESONANT ALTERNATING CURRENT LINKAGE

(71) Applicant: Enphase Energy, Inc., Petaluma, CA (US)

(72) Inventors: Martin Fornage, Petaluma, CA (US); Donald Richard Zimmanck, Petaluma, CA (US); Fabio Augusto Mendes Pereira, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 11 days.

(21) Appl. No.: 14/450,858

(22) Filed: Aug. 4, 2014

(65) Prior Publication Data

US 2014/0340942 A1    Nov. 20, 2014

Related U.S. Application Data

(63) Continuation of application No. 13/476,683, filed on May 21, 2012, now Pat. No. 8,797,767.

(60) Provisional application No. 61/488,524, filed on May 20, 2011.

(51) Int. Cl.
| *H02M 7/5395* | (2006.01) |
| *H02M 3/335* | (2006.01) |
| *H02M 7/48* | (2007.01) |
| *H02J 3/38* | (2006.01) |
| *H01F 30/14* | (2006.01) |

(52) U.S. Cl.
CPC ........... *H02M 3/33546* (2013.01); *H02J 3/383* (2013.01); *H02M 7/4807* (2013.01); *H01F 30/14* (2013.01); *Y02E 10/563* (2013.01)

(58) Field of Classification Search
CPC .................................................. H02M 3/33546
See application file for complete search history.

(56) References Cited

U.S. PATENT DOCUMENTS

| 4,012,682 A | 3/1977 | Carroll et al. |
| 4,153,837 A | 5/1979 | Ross |
| 4,363,243 A | 12/1982 | Poff |
| 4,417,477 A | 11/1983 | Poff |

(Continued)

FOREIGN PATENT DOCUMENTS

| EP | 0487970 A2 | 6/1992 |
| EP | 1264385 A2 | 12/2002 |

(Continued)

OTHER PUBLICATIONS

International Search Report and Written Opinion, Mailed on Aug. 2, 2012, PCT Application No. PCT/US2012/038834, 6 Pages.

(Continued)

*Primary Examiner* — Emily P Pham
(74) *Attorney, Agent, or Firm* — Moser Taboada

(57) ABSTRACT

An apparatus and system for power conversion. In one embodiment, the apparatus comprises a transformer having a primary winding and a plurality of secondary windings; and a cyclo-converter comprising a plurality of switch pairs for converting an alternating current to an AC current, wherein each switch pair in the plurality of switch pairs (i) is coupled between two lines of an AC output and (ii) has a different secondary winding of the plurality of secondary windings coupled between its switches.

16 Claims, 6 Drawing Sheets

(56) References Cited

U.S. PATENT DOCUMENTS

| | | | |
|---|---|---|---|
| 4,459,532 A | 7/1984 | Schutten et al. | |
| 4,459,535 A | 7/1984 | Schutten et al. | |
| 4,469,999 A | 9/1984 | Swenson | |
| 4,706,175 A | 11/1987 | Schutten et al. | |
| 4,706,183 A | 11/1987 | Schutten et al. | |
| 5,652,503 A | 7/1997 | Urban et al. | |
| 5,892,667 A | 4/1999 | Glasband et al. | |
| 6,014,323 A * | 1/2000 | Aiello | H02M 5/271 323/361 |
| 6,359,795 B1 | 3/2002 | Amantea et al. | |
| 7,050,312 B2 | 5/2006 | Tracy et al. | |
| 7,088,601 B2 | 8/2006 | Tracy et al. | |
| 7,113,405 B2 | 9/2006 | Armstrong et al. | |
| 7,405,494 B2 | 7/2008 | Tassitino et al. | |
| 7,508,094 B2 | 3/2009 | Johnson et al. | |
| 7,561,451 B2 | 7/2009 | Tracy et al. | |
| 7,567,443 B2 * | 7/2009 | Shiga | H02M 3/33561 363/17 |
| 7,583,109 B2 | 9/2009 | Oughton et al. | |
| 7,684,222 B2 | 3/2010 | Paatero | |
| 7,768,800 B2 * | 8/2010 | Mazumder | H02M 5/458 363/17 |
| 7,800,924 B2 | 9/2010 | Oughton et al. | |
| 7,948,778 B2 | 5/2011 | Pfitzer et al. | |
| 8,000,118 B1 | 8/2011 | Limpaecher et al. | |
| 8,520,409 B2 * | 8/2013 | Harrison | H02M 1/4216 363/17 |
| 2005/0078497 A1 | 4/2005 | Venkataramanan | |
| 2007/0024257 A1 | 2/2007 | Boldo | |
| 2007/0096718 A1 * | 5/2007 | Birlingmair | G01R 15/183 324/117 R |
| 2008/0239775 A1 | 10/2008 | Oughton et al. | |
| 2008/0265681 A1 | 10/2008 | Pfitzer et al. | |
| 2009/0196082 A1 | 8/2009 | Mazumder et al. | |
| 2009/0225569 A1 * | 9/2009 | Begalke | H02M 3/3378 363/17 |
| 2009/0243531 A1 | 10/2009 | Hirono | |
| 2009/0323380 A1 * | 12/2009 | Harrison | H02M 1/4216 363/126 |
| 2010/0014322 A1 | 1/2010 | Harrison | |
| 2010/0290174 A1 | 11/2010 | Harrison | |
| 2011/0181128 A1 * | 7/2011 | Perreault | H02M 7/797 307/151 |
| 2011/0278932 A1 | 11/2011 | Navarro et al. | |
| 2012/0038434 A1 | 2/2012 | Harrison | |
| 2012/0068541 A1 | 3/2012 | Anderson | |
| 2012/0074786 A1 | 3/2012 | Johnson, Jr. et al. | |
| 2012/0086536 A1 | 4/2012 | Harrison | |
| 2012/0092913 A1 | 4/2012 | Harrison | |
| 2012/0139514 A1 | 6/2012 | Paatero | |
| 2012/0153995 A1 | 6/2012 | Oughton, Jr. et al. | |

FOREIGN PATENT DOCUMENTS

| | | |
|---|---|---|
| EP | 1744140 A2 | 1/2007 |
| EP | 2079140 A1 | 7/2009 |
| JP | H1075580 A | 3/1996 |
| JP | H1075580 (A) | 3/1998 |
| RU | 2256284 C1 | 7/2005 |
| SU | 1713045 A1 | 2/1992 |
| WO | WO-0165659 A2 | 9/2001 |
| WO | WO-2006043837 A2 | 4/2006 |
| WO | WO-2008026938 A2 | 3/2008 |
| WO | WO-2010055282 A1 | 5/2010 |
| WO | WO-2011062508 A2 | 5/2011 |
| WO | WO-2011102910 A1 | 8/2011 |
| WO | WO-2012002824 A2 | 1/2012 |
| WO | WO-2012002825 A2 | 1/2012 |
| WO | WO-2012005604 A2 | 1/2012 |
| WO | WO-2012062375 A1 | 5/2012 |
| WO | WO-2012081998 A2 | 6/2012 |

OTHER PUBLICATIONS

European Patent Office Substantive Search Report, Application No. 12789410.3-1809 / 2710721 PCT/US2012038834, 6 Pages, Feb. 17, 2015.
H. Sri et al., "Voltage SAG Mitigation Using A High-Frequency-Link Cycloconverter-Based DVR", IEEE, 2000, pp. 344-349.
A. Trubitsyn et al., "High-Efficiency Inverter for Photovoltaic Applications", IEEE, 2010, pp. 2803-2810.
US 6,181,581, 01/2001, Johnson, Jr. et al. (withdrawn)

* cited by examiner

POWER CONVERSION CIRCUIT ARRANGEMENTS UTILIZING RESONANT ALTERNATING CURRENT LINKAGE

CROSS-REFERENCE TO RELATED APPLICATIONS

This application is a continuation of co-pending U.S. patent application Ser. No. 13/476,683, filed May 21, 2012, which issued as U.S. Pat. No. 8,797,767 on Aug. 5, 2014 and which claims benefit of U.S. provisional patent application Ser. No. 61/488,524, filed May 20, 2011. The aforementioned patent and patent applications are herein incorporated in their entirety by reference.

BACKGROUND OF THE INVENTION

1. Field of the Invention

Embodiments of the invention relate to power conversion and, more particularly, to a resonant power converter circuit.

2. Description of the Related Art

Generally, as shown in FIG. 1, a DC-AC resonant power converter 100 comprises a bridge circuit 102 and resonant circuit 104 on the "DC side" 120 and a cyclo-converter circuit 108 on the "AC side" 122. As is well known in the art, the power converter circuit 100 can be used for DC to AC conversion or AC to DC conversion. Thus, the left side may be coupled to either a DC source or DC load and the right side can be coupled to an AC load or AC source.

A transformer 106 couples the two sides to one another—a primary winding 106-P is connected to the DC side and a secondary winding 106-S is connected to the AC side. A first terminal of the secondary transformer winding 106-S couples to one terminal of three bidirectional switches 110-1, 110-2, and 110-3. A second terminal of each of the three switches 110-1, 110-2, and 110-3 is connected to one of the three phases (live conductor lines L1, L2, and L3) of an AC source or load. The second terminal of the transformer secondary winding 106-S is connected to a neutral point (neutral line N) that can be connected to the AC source/load or not.

Bypass capacitors 112-1, 112-2, and 112-3 are connected from neutral line N to the respective lines L1, L2, and L3. Capacitors may be connected across each switch in the case of an LCC type resonant converter. One issue with this resonant converter circuit topology is that bidirectional switches are not commercially readily available and must be implemented with back-to-back unidirectional switches such as metal-oxide-semiconductor field-effect transistors (MOSFETs), insulated gate bipolar transistors (IGBTs), bipolar junction transistors (BJTs), and the like. These switches have to be driven from the midpoint which swings at very high speed. In turn, such a midpoint drive creates undue drive circuit complexity as the required isolation needs to withstand very high dV/dt common mode voltages. Consequently, the drive circuit requires high isolation voltage supplies, fiber optic connections, and the like. Such complexity increases the cost of the resonant power converter.

Therefore, there is a need in the art for a resonant power converter that mitigates the foregoing problems.

SUMMARY OF THE INVENTION

Embodiments of the present invention generally relate to an apparatus and system for power conversion. In one embodiment, the apparatus comprises a transformer having a primary winding and a plurality of secondary windings; and a cyclo-converter comprising a plurality of switch pairs for converting an alternating current to a multi-phase AC current, wherein each switch pair in the plurality of switch pairs (i) is coupled between a different set of lines of an AC output and (ii) has a different secondary winding of the plurality of secondary windings coupled between its switches.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 2:
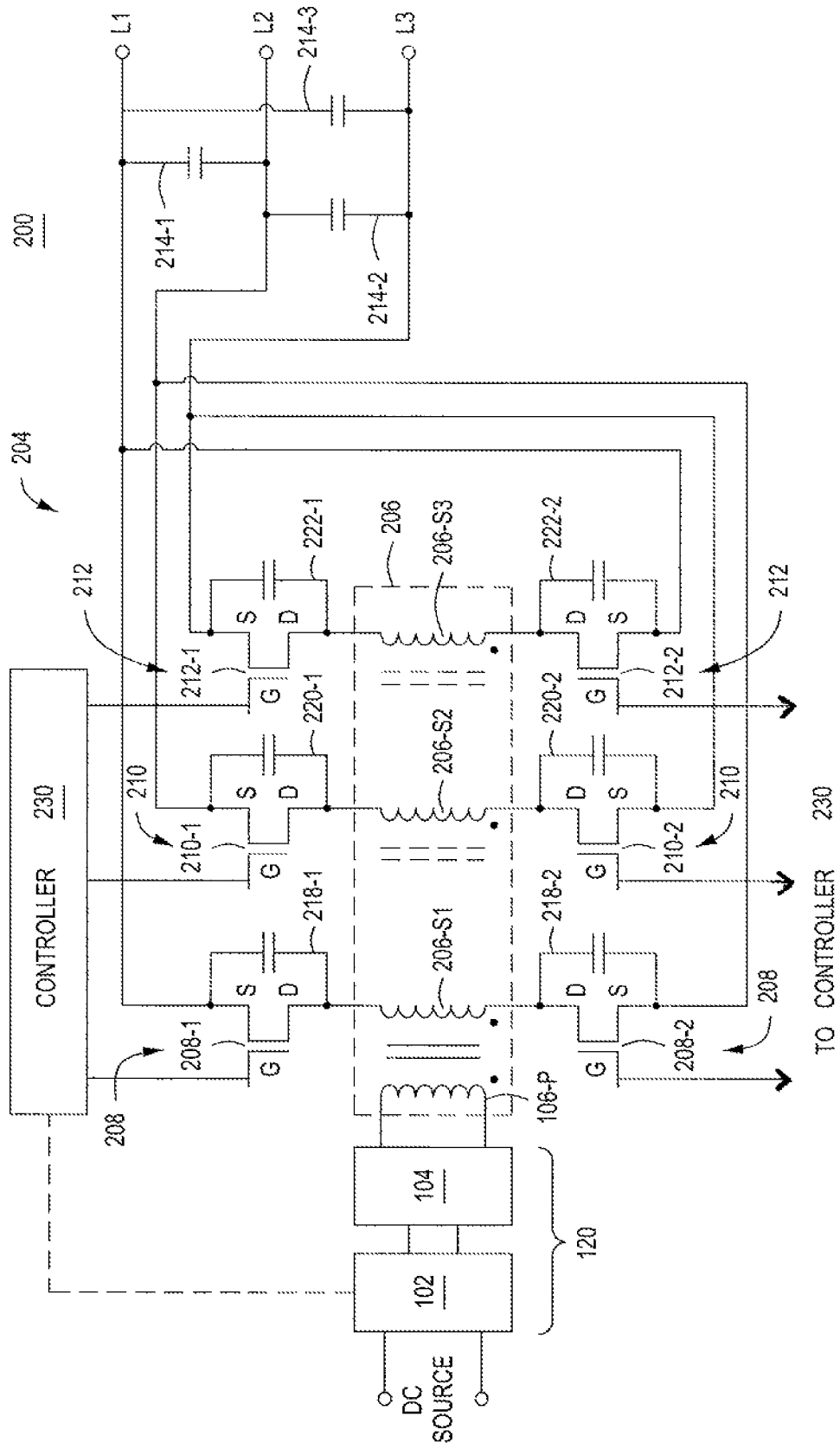
FIG. 2 is a schematic diagram of a power conversion circuit comprising a cyclo-converter in accordance with one or more embodiments of the present invention.

FIG. 2 is a schematic diagram of a power conversion circuit 200 comprising a cyclo-converter 204 in accordance with one or more embodiments of the present invention. This diagram only portrays one variation of the myriad of possible system configurations. The present invention can function in a variety of power generation environments and systems.

Figure 1:
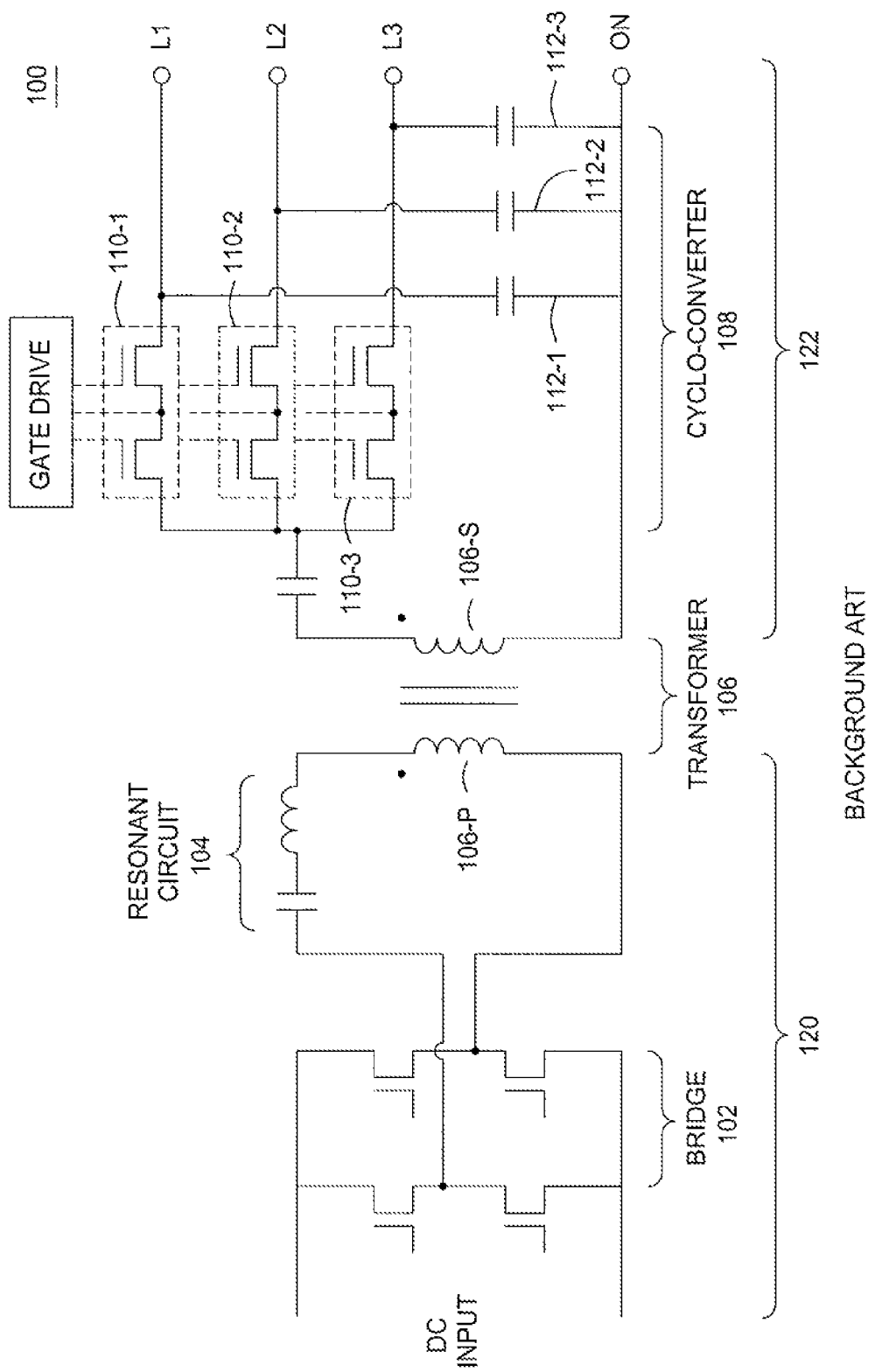
FIG. 1 is a schematic diagram of a well-known resonant power converter of the background art.

The DC side 120 of the conversion circuit 200 is the same as described above with respect to the background art in FIG. 1. A transformer 206 couples the resonant circuit 104 to a cyclo-converter 204 having an output coupled to AC live conductor lines L1, L2, and L3 of a multi-phase AC line. The AC line may be coupled to an AC source or an AC load. In one embodiment of the invention, the secondary of the transformer 206 is divided into 3 windings 206-S1, 206-S2, and 206-S3 that are wound together (tri-filar winding). The ends of each winding are not connected together. Generally, the three windings 206-S1, 206-S2, and 206-S3 would each have the same number of turns, which may be different from the number of turns of the primary winding 106-P. The turns ratio of the secondaries 206-S1/206-S2/206-S3 to the primary 106-P depends on the ratio between input and output voltages; in some embodiments, the turns ratio may be 1:6.

The cyclo-converter 204 comprises three switch pairs 208 (having switches 208-1 and 208-2), 210 (having switches 210-1 and 210-2), and 212 (having switches 212-1 and 212-2). In one embodiment of the invention, each switch pair 208, 210, and 212 has a different secondary winding 206-S1, 206-S2, or 206-S3 coupled between drain terminals of its switches. For example, the secondary winding 206-S1 may be coupled between drain terminals of the switches 208-1 and 208-2; the secondary winding 206-S2 may be coupled between drain terminals of the switches 210-1 and 210-2; and the secondary winding 206-S3 may be coupled between drain terminals of the switches 212-1 and 212-2. The switches of each switch pair 208, 210, and 212 (which may be MOSFETs, IGBTs, BJTs and the like) may now be connected with their source terminal on a "quiet" signal, such as neutral line N (as described below with respect to FIG. 3) or L1, L2 and L3. Such an arrangement eliminates the high dV/dt issues mentioned with respect to the background art.

The embodiment of FIG. 2 is a "delta" configuration, where the sources of each switch pair 208, 210, and 212 are coupled to an output line L1, L2, or L3. Thus, the first pair of switches 208 couple from the transformer secondary 206-S1 to line L1 and line L2; the second pair of switches 210 couple from the transformer secondary 206-S2 to lines L2 and L3; and the third pair of switches 212 couple from the transformer secondary 206-S2 to lines L3 and L1. Additionally, an output capacitor 214-1 is coupled between line L1 and line L2; an output capacitor 214-2 is coupled between line L2 and line L3; and an output capacitor 214-3 is coupled between line L1 and line L3. The capacitances of the output capacitors 214 generally depends on the power level; in some embodiments, each of the output capacitors 214 may have a capacitance of 500 nanofarads (nF). Each switch 208-1, 208-2, 210-1, 210-2, 212-1 and 212-2, may have a capacitor 218-1, 218-2, 220-1, 220-2, 222-1 and 222-2, respectively, coupled across its drain and source terminals; such capacitors across each switch (D-S) are optional and in some embodiments may each have a capacitance of 1 nF. The output capacitors 214-1, 214-2, and 214-3 between lines L1-L2, L2-L3, and L1-L3, respectively, are not optional.

Gate terminals of each switch pair 208, 210, and 212 are coupled to a controller 230 which provides the control signals for driving the cyclo-converter 204 to perform the required DC-AC or AC-DC conversion. In some embodiments, the controller 230 may also be coupled to the bridge 102 for driving the bridge switches. In one embodiment, the controller 230 may be a control system used to switch (i.e., drive the gates of) the cyclo-converter switches 208, 210, and 212 that is the same as the control system as is used in the background art and well-known to those skilled in the art. In another embodiment, the controller 230 may comprise the control system described in commonly assigned U.S. patent application Ser. No. 13/342,368, titled "Method and Apparatus for Resonant Power Conversion" and filed Jan. 3, 2012, which is herein incorporated by reference in its entirety.

Figure 3:
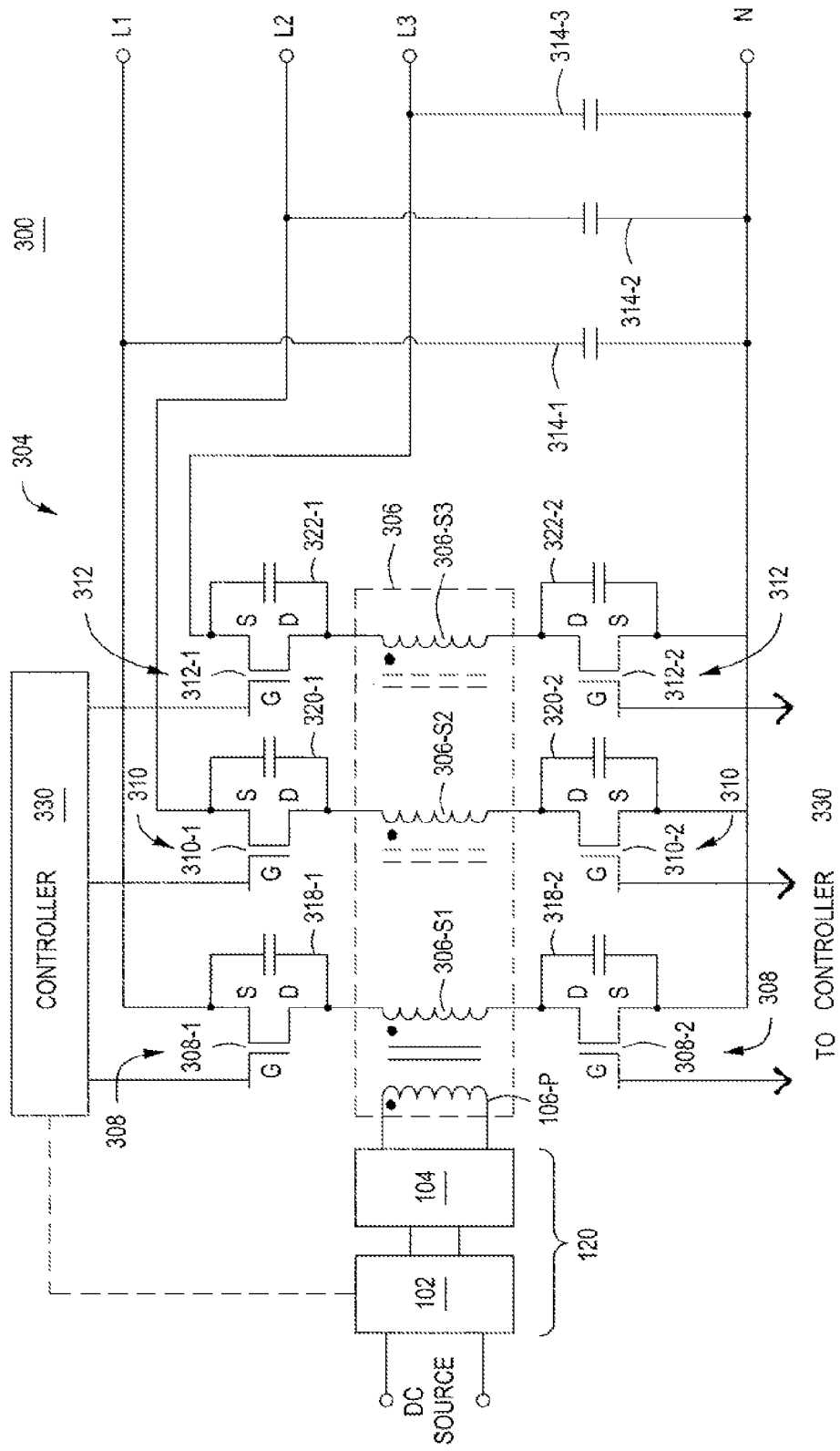
FIG. 3 is a schematic diagram of a power conversion circuit comprising a cyclo-converter in accordance with one or more embodiments of the present invention.

FIG. 3 is a schematic diagram of a power conversion circuit 300 comprising a cyclo-converter 304 in accordance with one or more embodiments of the present invention. The DC side 120 of the conversion circuit 300 is the same as described above with respect to the background art in FIG. 1. A transformer 306 couples the resonant circuit 104 to a cyclo-converter 304 having an output coupled to AC live conductor lines L1, L2, and L3 of a multi-phase AC line which may be coupled to an AC source or an AC load. The cyclo-converter output is also coupled to a neutral line N, which may or may not be coupled to the AC source/load. In one embodiment of the invention, the secondary of the transformer 306 is divided into 3 windings 306-S1, 306-S2, and 306-S3 that are wound together (i.e., a tri-filar winding), the ends of each winding are not connected together, analogous to the transformer 206 of FIG. 2. Generally, the three windings 306-S1, 306-S2, and 306-S3 would each have the same number of turns, which may be different from the number of turns of the primary winding 106-P. As a result of the effective voltage for the power conversion circuit 300, the turns ratio of the secondaries 306-S1/306-S2/306-S3 to the primary 106-P would generally be smaller than the turns ratio for the power conversion circuit 200; for example, in some embodiments the turns ratio of the secondaries 306-S1/306-S2/306-S3 to the primary 106-P may be 1:5.

The cyclo-converter 304 comprises three switch pairs 308 (having switches 308-1 and 308-2), 310 (having switches 310-1 and 310-2), and 312 (having switches 312-1 and 312-2), analogous to the switch pairs 208, 210, and 212 of FIG. 2. Each switch pair 308, 310, and 312 has a different secondary winding 306-S1, 306-S2, or 306-S3 coupled between drain terminals of its switches. For example, the secondary winding 306-S1 may be coupled between drain terminals of the switches 308-1 and 308-2; the secondary winding 306-S2 may be coupled between drain terminals of the switches 310-1 and 310-2; and the secondary winding 306-S3 may be coupled between drain terminals of the switches 312-1 and 312-2. The switches of each switch pair 308, 310, and 312 may be MOSFETs, IGBTs, BJTs and the like.

The embodiment of FIG. 3 is a "Y" configuration, where one of the sources of each switch pair 308, 310, and 312 is coupled to an output line L1, L2, or L3, and the other source of each switch pair 308, 310, and 312 is coupled to the neutral line N. Thus, the first pair of switches 308 couple from the transformer secondary 306-S1 to line L1 and N; the second pair of switches 310 couple from the transformer secondary 306-S2 to lines L2 and N; and the third pair of switches 312 couple from the transformer secondary 306-S2 to lines L3 and N. Additionally, an output capacitor 314-1 is coupled between line L1 and N; an output capacitor 314-2 is coupled between line L2 and N; and an output capacitor 314-3 is coupled between line L3 and N. The capacitance of each of the output capacitors 314 may generally be on the order of the capacitance of each of the output capacitors 214 (e.g., 500 nF in some embodiments), although the capacitance of each of the output capacitors 314 may be slightly larger as the Y configuration of power conversion circuit 300 would have slightly larger currents than the delta configuration of the power conversion circuit 200. Each switch 308-1, 308-2, 310-1, 310-2, 312-1 and 312-2, may have a capacitor 318-1, 318-2, 320-1, 320-2, 322-1 and 322-2, respectively, coupled across its drain and source terminals; such capacitors across each switch (D-S) are optional and in some embodiments may each have a capacitance of 1 nF. The output capacitors 314-1, 314-2, and 314-3 between L1-N, L2-N and L3-N, respectively, are not optional.

The difference in function between the delta configuration depicted in FIG. 2 and the Y configuration depicted in FIG. 3 is that the blocking voltage across each switch is higher for the delta configuration than for the Y configuration.

Gate terminals of each switch pair 308, 310, and 312 are coupled to a controller 330 which provides the control signals for driving the cyclo-converter 304 to perform the required DC-AC or AC-DC conversion. In some embodiments, the controller 330 may also be coupled to the bridge 102 for driving the bridge switches. In one embodiment, the controller 330 may be a control system used to switch (i.e., drive the gates of) the cyclo-converter switches 308, 310, and 312 that is the same as the control system as is used in the background art and well-known to those skilled in the art. In another embodiment, the controller 330 may comprise the control system described in previously referenced commonly assigned U.S. patent application Ser. No. 13/342,368, titled "Method and Apparatus for Resonant Power Conversion" and filed Jan. 3, 2012.

Figure 4:
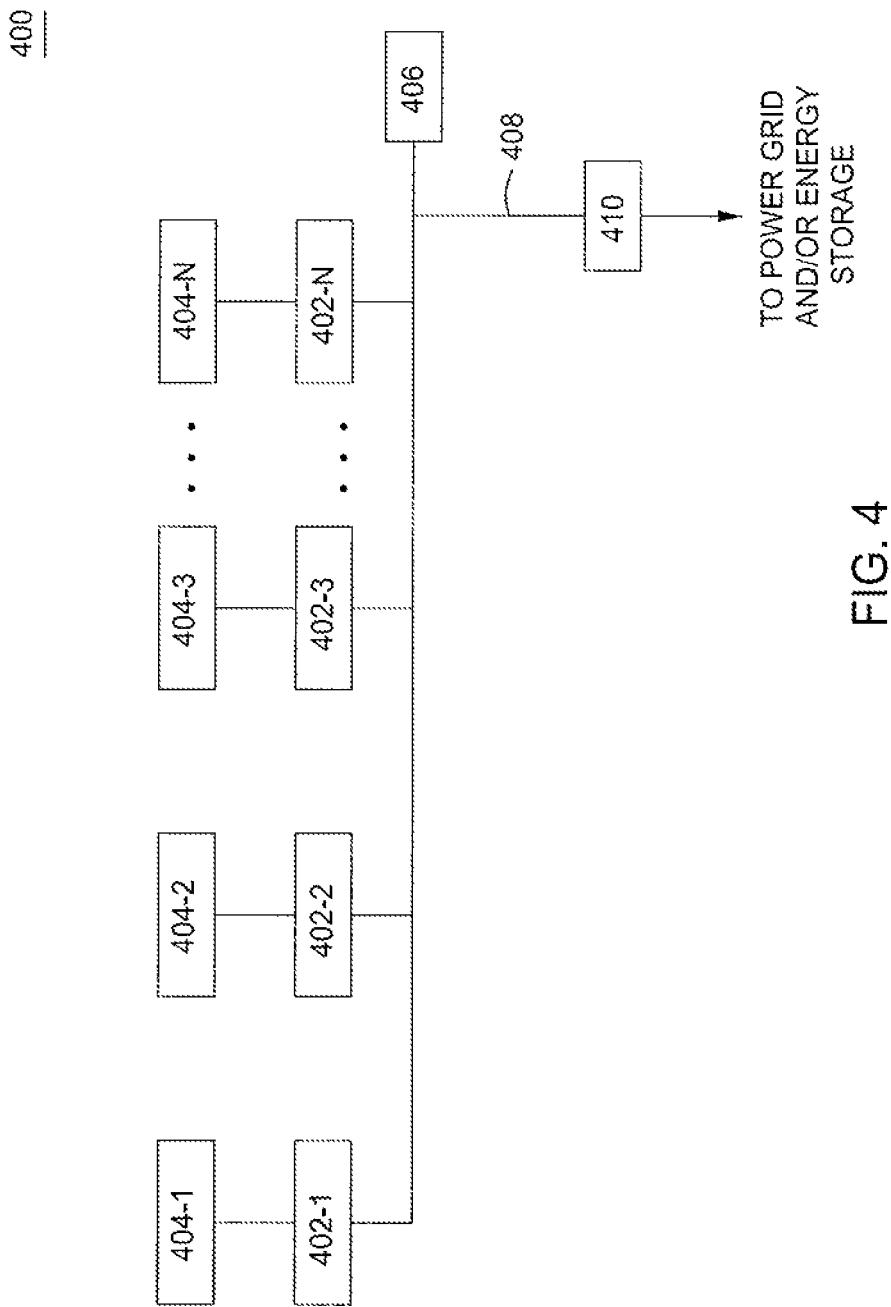
FIG. 4 is a block diagram of a system for power conversion comprising one or more embodiments of the present invention.

FIG. 4 is a block diagram of a system 400 for power conversion comprising one or more embodiments of the present invention. This diagram only portrays one variation of the myriad of possible system configurations and devices that may utilize the present invention. The present invention can be utilized in any system or device requiring a DC-AC or AC-DC converter.

The system 400 comprises a plurality of power converters 402-1, 402-2, 402-3 . . . 402-N, collectively referred to as power converters 402; a plurality of DC power sources 404-1, 404-2, 404-3 . . . 404-N, collectively referred to as DC power sources 404; a system controller 406; a bus 408; and a load center 410. The DC power sources 404 may be any suitable DC source, such as an output from a previous power conversion stage, a battery, a renewable energy source (e.g., a solar panel or photovoltaic (PV) module, a wind turbine, a hydroelectric system, or similar source of power generated from a renewable energy resource), or the like, for providing DC power. The power converters 402 may be power conversion circuits 200 comprising cyclo-converters 204, power conversion circuits 300 comprising cyclo-converters 304, or a mix thereof. In some other embodiments, the power converters may be power conversion circuits 500 comprising cyclo-converters 504 or power conversion circuits 600 comprising cyclo-converters 604.

Each power converter 402-1, 402-2, 402-3 . . . 402-N is coupled to a single DC power source 404-1, 404-2, 404-3 . . . 404-N, respectively; in some alternative embodiments, multiple DC power sources 404 may be coupled to a single power converter 402, for example a single centralized power converter 402. The power converters 402 are coupled to the system controller 406 via the bus 408. The system controller 406 is capable of communicating with the power converters 402 by wireless and/or wired communication for providing operative control of the power converters 402. The power converters 402 are further coupled to the load center 410 via the bus 408.

The power converters 402 are each capable of converting the received DC power to AC power, although in other embodiments the power converters may receive an AC input and convert the received input to a DC output. The power converters 402 couple the generated output power to the load center 410 via the bus 408. The generated power may then be distributed for use, for example to one or more appliances, and/or the generated energy may be stored for later use, for example using batteries, heated water, hydro pumping, $H_2O$-to-hydrogen conversion, or the like. In some embodiments, the power converters 402 convert the DC input power to AC power that is commercial power grid compliant and couple the AC power to the commercial power grid via the load center 410. Each of the power converters 404 may or may not be coupled to a neutral line.

As previously described with respect to FIGS. 2 and 3, and as described further below with respect to FIGS. 5 and 6, the switches of the power converter cyclo-converters have their source terminals coupled to a "quiet" signal, such as neutral line (i.e., line N) or live conductor lines (i.e., L1, L2 or L3). Such an arrangement eliminates high dV/dt issues mentioned with respect to the background art of FIG. 1.

Figure 5:
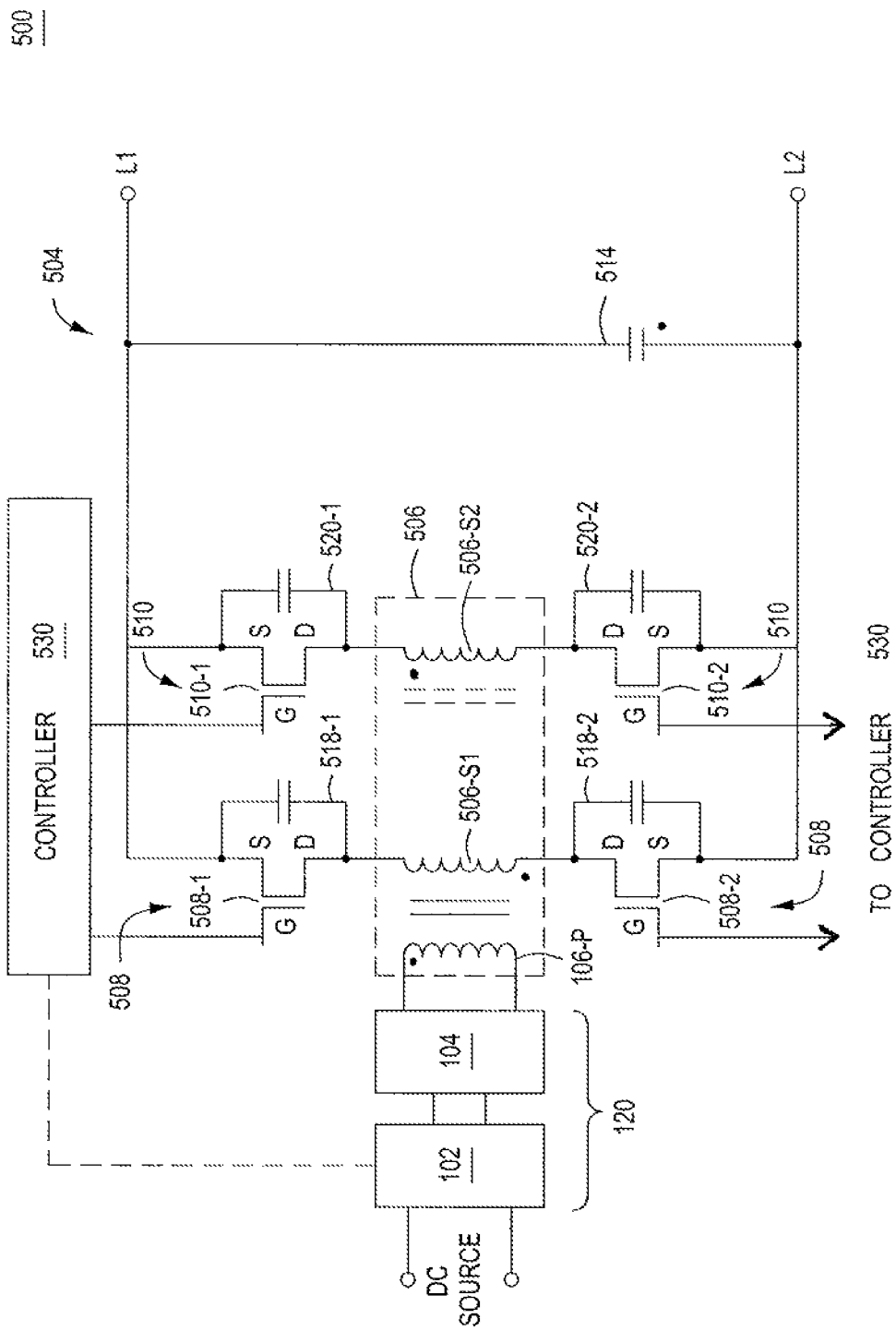
FIG. 5 is a schematic diagram of a power conversion circuit comprising a single-phase cyclo-converter in accordance with one or more embodiments of the present invention.

FIG. 5 is a schematic diagram of a power conversion circuit 500 comprising a single-phase cyclo-converter 504 in accordance with one or more embodiments of the present invention. The DC side 120 of the conversion circuit 500 is the same as described above with respect to the background art in FIG. 1. A transformer 506 couples the resonant circuit 104 to a cyclo-converter 504 having an output coupled to AC live conductor lines L1 and L2 of a single-phase AC line which may be coupled to an AC source or an AC load; in some other embodiments, the cyclo-converter output may be coupled to an AC live conductor line, e.g., L1, and a neutral line N. In one embodiment of the invention, the secondary of the transformer 506 is divided into two windings 506-S1 and 506-S2 that are wound together (i.e., a bifilar winding), where the ends of each winding are not connected together. Generally, the two windings 506-S1 and 506-S2 would each have the same number of turns, which may be different from the number of turns of the primary winding 106-P. In some embodiments the turns ratio of the secondaries 506-S1/506-S2 to the primary 106-P may be 1:6.

The cyclo-converter 504 comprises two switch pairs 508 (having switches 508-1 and 508-2) and 510 (having switches 510-1 and 510-2). The switch pair 508 has the secondary winding 506-S1 coupled between drain terminals of its switches, and the switch pair 510 has the secondary winding 506-S2 coupled between drain terminals of its switches. The switches of each switch pair 508 and 510 may be MOSFETs, IGBTs, BJTs and the like.

The sources of the switches 508-1 and 510-1 are each coupled to the output line L1, and the sources of the switches 508-2 and 510-2 are each coupled to the output line L2. Additionally, an output capacitor 514 is coupled between lines L1 and L2; in some embodiments, the capacitor 514 may be on the order 500 nF. Each switch 508-1, 508-2, 510-1, and 510-2 may have a capacitor 518-1, 518-2, 520-1, and 520-2, respectively, coupled across its drain and source terminals; such capacitors across each switch (D-S) are optional and in some embodiments may each have a capacitance of 1 nF. The output capacitor 514 across L1-L2 is not optional.

The cyclo-converter switches of each switch pair 508 and 510 are now coupled such that their source terminals are on a "quiet" signal, such as line L1 or L2. Such an arrangement eliminates the high dV/dt issues mentioned with respect to the background art.

Gate terminals of each switch pair 508 and 510 are coupled to a controller 530 which provides the control signals for driving the cyclo-converter 504 to perform the required DC-AC or AC-DC conversion. In some embodiments, the controller 530 may also be coupled to the bridge 102 for driving the bridge switches. In one embodiment, the controller 530 may be a control system used to switch (i.e., drive the gates of) the cyclo-converter switches 508 and 510 that is the same as the control system as is used in the background art and well-known to those skilled in the art. In another embodiment, the controller 530 may comprise the control system described in previously referenced commonly assigned U.S. patent application Ser. No. 13/342,368, titled "Method and Apparatus for Resonant Power Conversion" and filed Jan. 3, 2012.

FIG. 5 is a schematic diagram of a power conversion circuit 500 comprising a single-phase cyclo-converter 504 in accordance with one or more embodiments of the present invention. The DC side 120 of the conversion circuit 500 is the same as described above with respect to the background art in FIG. 1. A transformer 506 couples the resonant circuit 104 to a cyclo-converter 504 having an output coupled to AC live conductor lines L1 and L2 of a single-phase AC line which may be coupled to an AC source or an AC load; in some other embodiments, the cyclo-converter output may be coupled to an AC live conductor line, e.g., L1, and a neutral line N. In one embodiment of the invention, the secondary of the transformer 506 is divided into two windings 506-S1 and 506-S2 that are wound together (i.e., a bifilar winding), where the ends of each winding are not connected together. Generally, the two windings 506-S1 and 506-S2 would each have the same number of turns, which may be different from the number of turns of the primary winding 106-P. In some embodiments the turns ratio of the secondaries 506-S1/506-S2 to the primary 106-P may be 1:6.

The cyclo-converter 504 comprises two switch pairs 508 (having switches 508-1 and 508-2) and 510 (having switches 510-1 and 510-2). The switch pair 508 has the secondary winding 506-S1 coupled between drain terminals of its switches, and the switch pair 510 has the secondary winding 506-S2 coupled between drain terminals of its switches. The switches of each switch pair 508 and 510 may be MOSFETs, IGBTs, BJTs and the like.

The sources of the switches 508-1 and 510-1 are each coupled to the output line L1, and the sources of the switches 508-2 and 510-2 are each coupled to the output line L2. Additionally, an output capacitor 514 is coupled between lines L1 and L2; in some embodiments, the capacitor 514 may be on the order 500 nF. Each switch 508-1, 508-2, 510-1, and 510-2 may have a capacitor 518-1, 518-2, 520-1, and 520-2, respectively, coupled across its drain and source terminals; such capacitors across each switch (D-S) are optional and in some embodiments may each have a capacitance of 1 nF. The output capacitor 514 across L1-L2 is not optional.

The cyclo-converter switches of each switch pair 508 and 510 are now coupled such that their source terminals are on a "quiet" signal, such as line L1 or L2. Such an arrangement eliminates the high dV/dt issues mentioned with respect to the background art.

Gate terminals of each switch pair 508 and 510 are coupled to a controller 530 which provides the control signals for driving the cyclo-converter 504 to perform the required DC-AC or AC-DC conversion. In some embodiments, the controller 530 may also be coupled to the bridge 102 for driving the bridge switches. In one embodiment, the controller 530 may be a control system used to switch (i.e., drive the gates of) the cyclo-converter switches 508 and 510 that is the same as the control system as is used in the background art and well-known to those skilled in the art. In another embodiment, the controller 530 may comprise the control system described in previously referenced commonly assigned U.S. patent application Ser. No. 13/342,368, titled "Method and Apparatus for Resonant Power Conversion" and filed Jan. 3, 2012.

Figure 6:
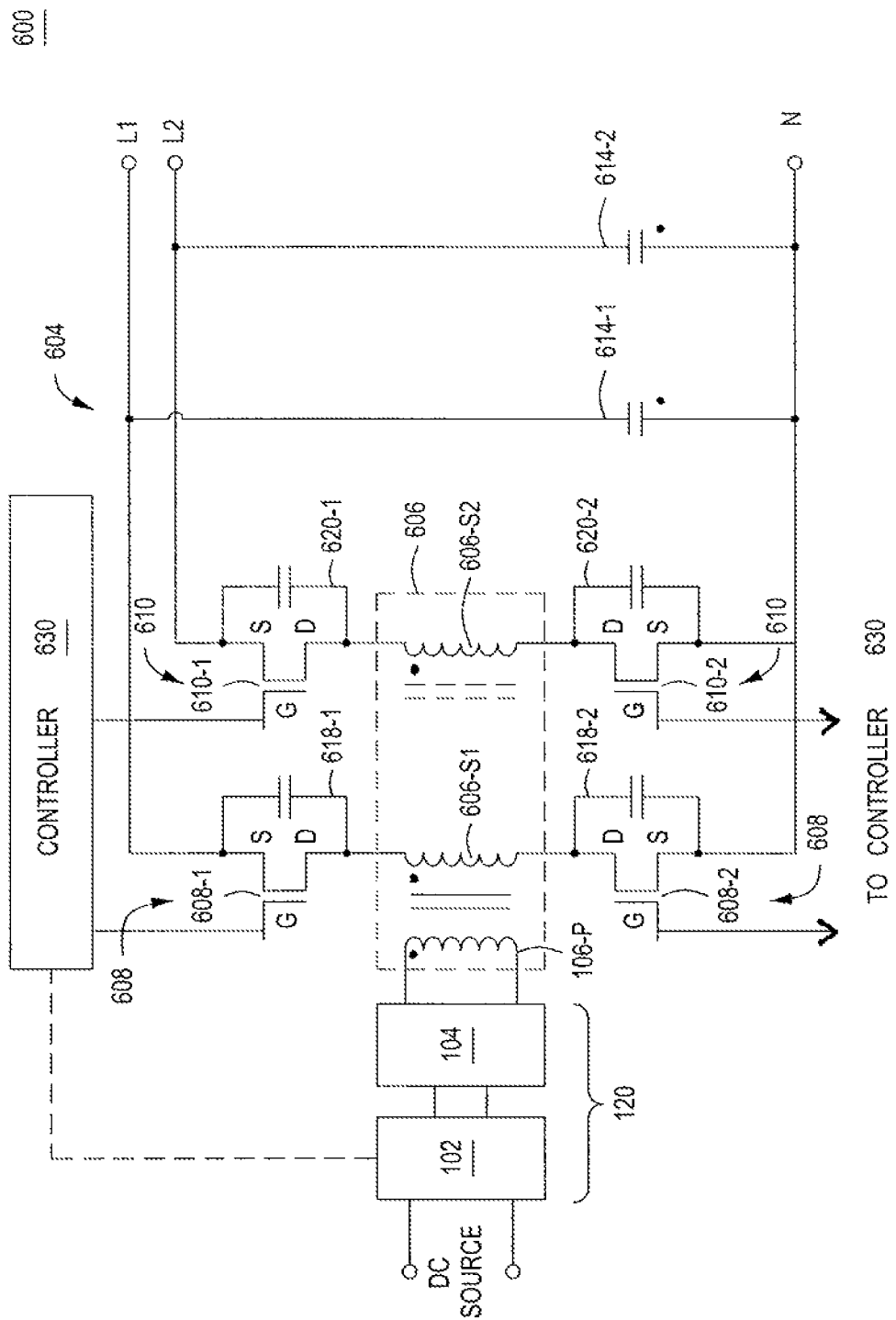
FIG. 6 is a schematic diagram of a power conversion circuit comprising a split-phase cyclo-converter in accordance with one or more embodiments of the present invention.

FIG. 6 is a schematic diagram of a power conversion circuit 600 comprising a split-phase cyclo-converter 604 in accordance with one or more embodiments of the present invention. The DC side 120 of the conversion circuit 600 is the same as described above with respect to the background art in FIG. 1. A transformer 606 couples the resonant circuit 104 to a cyclo-converter 604 having an output coupled to AC live conductor lines L1 and L2 of a split-phase AC line which may be coupled to an AC source or an AC load. The cyclo-converter output is also coupled to a neutral line N, which may or may not be coupled to the AC source/load. In one embodiment of the invention, the secondary of the transformer 606 is divided into two windings 606-S1 and 606-S2 that are wound together (i.e., a bifilar winding), where the ends of each winding are not connected together. Generally, the two windings 606-S1 and 606-S2 would each have the same number of turns, which may be different from the number of turns of the primary winding 106-P. In some embodiments the turns ratio of the secondaries 606-S1/606-S2 to the primary 106-P may be 1:6.

The cyclo-converter 604 comprises two switch pairs 608 (having switches 608-1 and 608-2) and 610 (having switches 610-1 and 610-2). The switch pair 608 has the secondary winding 606-S1 coupled between drain terminals of its switches, and the switch pair 610 has the secondary winding 606-S2 coupled between drain terminals of its switches. The switches of each switch pair 608 and 610 may be MOSFETs, IGBTs, BJTs and the like.

The source of the switch 608-1 is coupled to the output line L1, and the source of the switch 610-1 is coupled to the output line L2. The sources of the switches 608-2 and 610-2 are each coupled to the neutral line N. Additionally, an output capacitor 614-1 is coupled between lines L1 and N, and an output capacitor 614-2 is coupled between lines L2 and N. In some embodiments, the capacitors 614-1 and 614-2 may each be on the order 500 nF. Each switch 608-1, 608-2, 610-1, and 610-2 may have a capacitor 618-1, 618-2, 620-1, and 620-2, respectively, coupled across its drain and source terminals; such capacitors across each switch (D-S) are optional and in some embodiments may each have a capacitance of 1 nF. The output capacitors 614-1 and 614-2 are not optional.

The cyclo-converter switches of each switch pair 608 and 610 are now coupled such that their source terminals are on a "quiet" signal, such as line L1, L2, or N. Such an arrangement eliminates the high dV/dt issues mentioned with respect to the background art.

Gate terminals of each switch pair 608 and 610 are coupled to a controller 630 which provides the control signals for driving the cyclo-converter 604 to perform the required DC-AC or AC-DC conversion. In some embodiments, the controller 630 may also be coupled to the bridge 102 for driving the bridge switches. In one embodiment, the controller 630 may be a control system used to switch (i.e., drive the gates of) the cyclo-converter switches 608 and 610 that is the same as the control system as is used in the background art and well-known to those skilled in the art. In another embodiment, the controller 630 may comprise the control system described in previously referenced commonly assigned U.S. patent application Ser. No. 13/342,368, titled "Method and Apparatus for Resonant Power Conversion" and filed Jan. 3, 2012.

The foregoing description of embodiments of the invention comprises a number of elements, devices, circuits and/or assemblies that perform various functions as described. For example, the cyclo-converter is an example of a means for converting an alternating current to a multi-phase AC current. These elements, devices, circuits, and/or assemblies are exemplary implementations of means for performing their respectively described functions.

While the foregoing is directed to embodiments of the present invention, other and further embodiments of the invention may be devised without departing from the basic scope thereof, and the scope thereof is determined by the claims that follow.

The invention claimed is:

1. An apparatus for power conversion, comprising:
   a resonant circuit;
   a transformer having a primary winding coupled to the resonant circuit and having a plurality of secondary windings; and
   a cyclo-converter comprising a plurality of switch pairs for converting an alternating current to an AC current, wherein each switch pair in the plurality of switch pairs (i) is coupled between two lines of an AC output and (ii) has a different secondary winding of the plurality of secondary windings coupled between its switches, wherein the resonant circuit, the transformer, and the cyclo-converter form part of a resonant power converter.

2. The apparatus of claim 1, wherein the plurality of secondary windings comprises a first secondary winding and a second secondary winding.

3. The apparatus of claim 2, wherein the first and the second secondary windings are wound in a bifilar configuration.

4. The apparatus of claim 3, wherein the plurality of switch pairs comprises first and second switch pairs, and wherein the first and the second secondary windings are coupled between drain terminals of the first and the second switch pairs, respectively.

5. The apparatus of claim 4, wherein the first and the second switch pairs are coupled between a first AC live conductor line and a second AC live conductor line.

6. The apparatus of claim 4, wherein the first switch pair is coupled between a first AC live conductor line and a neutral line; and the second switch pair is coupled between a second AC live conductor line and the neutral line.

7. The apparatus of claim 1, further including a bridge coupled to the resonant circuit.

8. The apparatus of claim 7, wherein the resonant power converter converts a DC input received by the bridge into an AC output.

9. The apparatus of claim 7, wherein the resonant power converter converts an AC input to a DC output.

10. A system for power conversion, comprising:
 a DC source; and
 a resonant power converter, coupled to the DC source, for converting a DC current from the DC source to an AC current, wherein the resonant power converter comprises (a) a resonant circuit, (b) a transformer having a primary winding and a plurality of secondary windings, wherein the resonant circuit is coupled between the primary winding and each secondary winding of the plurality of secondary windings; and (c) a cyclo-converter comprising a plurality of switch pairs for converting an alternating current to the AC current, wherein each switch pair in the plurality of switch pairs (i) is coupled between two lines of an AC output and (ii) has a different secondary winding of the plurality of secondary windings coupled between its switches, and wherein the resonant circuit, the transformer, and the cyclo-converter form part of the resonant power converter.

11. The system of claim 10, wherein the plurality of secondary windings comprises a first secondary winding and a second secondary winding.

12. The system of claim 11, wherein the first and the second secondary windings are wound in a bifilar configuration.

13. The system of claim 12, wherein the plurality of switch pairs comprises first and second switch pairs, and wherein the first and the second secondary windings are coupled between drain terminals of the first and the second switch pairs, respectively.

14. The system of claim 13, wherein the first switch pair is coupled between a first AC live conductor line and a second AC live conductor line or a neutral line; and the second switch pair is coupled between the second AC live conductor line and the first AC live conductor line or the neutral line.

15. The system of claim 10, wherein the DC source is a renewable energy source.

16. The system of claim 10, wherein the DC source is a photovoltaic (PV) module.

* * * * *